United States Patent
Exel et al.

(10) Patent No.: US 6,877,869 B2
(45) Date of Patent: Apr. 12, 2005

(54) MIRROR FOR LASER APPLICATIONS AND METHOD FOR MANUFACTURE OF SAID MIRROR

(75) Inventors: Karl Exel, Rimbach (DE); Lothar Kugler, Salem (DE); Andreas Meyer, Eschenbach (DE); Jürgen Schulz-Harder, Lauf (DE); Karsten Schmidt, Eschenbach (DE)

(73) Assignee: Curamik Electronics GmbH (DE)

( * ) Notice: Subject to any disclaimer, the term of this patent is extended or adjusted under 35 U.S.C. 154(b) by 543 days.

(21) Appl. No.: 10/045,011

(22) Filed: Jan. 15, 2002

(65) Prior Publication Data

US 2002/0114374 A1 Aug. 22, 2002

(30) Foreign Application Priority Data

Jan. 16, 2001 (DE) ........................................ 101 01 887
Jan. 23, 2001 (DE) ........................................ 101 02 935

(51) Int. Cl.[7] .............................................. G02B 5/08
(52) U.S. Cl. ...................................................... 359/845
(58) Field of Search ................................. 359/838, 845, 359/223, 224; 165/104.33

(56) References Cited

U.S. PATENT DOCUMENTS

| | | |
|---|---|---|
| 3,781,094 A | 12/1973 | Griest |
| 4,387,962 A | 6/1983 | Gowan et al. |
| 4,403,828 A | 9/1983 | Davis et al. |
| 4,443,059 A | 4/1984 | Wells |
| 4,770,521 A | 9/1988 | Thompson et al. |
| 5,002,378 A | 3/1991 | Colarusso et al. |
| 6,053,241 A * | 4/2000 | Kendall ................. 165/104.33 |

FOREIGN PATENT DOCUMENTS

DE  3339076  5/1984

* cited by examiner

*Primary Examiner*—Euncha P. Cherry
(74) *Attorney, Agent, or Firm*—Hoffman Wasson & Gitler

(57) ABSTRACT

A mirror for laser application and a method for manufacturing the mirror is disclosed herein. The mirror comprises several layers including a top layer used as the mirror surface. A cooling structure including a plurality of cooler layers are providing between the top layer, several intermediate layers and a bottom layer. Connections are provided for allowing a coolant to flow within the mirror. The mirror is constructed by stacking the layers on top of one another and connecting adjacent layers together by direct copper bonding or active soldering.

20 Claims, 4 Drawing Sheets

MIRROR FOR LASER APPLICATIONS AND METHOD FOR MANUFACTURE OF SAID MIRROR

BACKGROUND OF THE INVENTION

1. Field of the Invention

The present invention refers to a cooled mirror for laser applications and in particular to a cooled mirror with a mirror body having a mirror surface and comprising several layers with their surfaces connected in a stack-like arrangement and forming a cooler structure with connections for the inlet and outlet of a coolant, whereby a first layer forming the top of the mirror contains or forms the mirror surface. The present invention refers also to a method for the manufacture of the said cooled mirror for laser applications.

2. Description of the Prior Art

In laser devices, for example in such devices used for processing parts, mirrors are generally needed for reflecting the laser beam, and are moved by a drive for processing of a part. Although the laser beam is generally sent as a widened beam to the mirror used in order to reduce the power density, it is common practice to actively cool such mirrors, using a coolant that flows through a cooler structure of the mirror body, preferably with a liquid coolant, for example such as water. The widened laser beam is then focused in a focal point by means of a lens for processing of the respective part. The focal point must be of high quality, i.e. in particular a pre-defined diameter, for example a circular diameter, and there must be an extremely homogeneous distribution of the laser power within the focal point. The part can be processed to meet quality requirements only if these conditions are fulfilled by a respective high-quality beam.

Therefore, mirrors for laser devices or the mirror surfaces of such mirrors must possess a high degree of mechanical and thermal stability, i.e. high stability against external forces and/or pressure, against temperature deviations or deformations etc., thus avoiding any resulting alterations and/or deformations of the mirror surface. Miniscule alterations and/or deformations, such as warping of the mirror surface in the sub-micrometer range already cause a serious decline in the beam quality of the laser beam reflected on the mirror, especially a decline in the shape or diameter of the beam and the quality of the laser beam focal point or focus on a surface of the part to be processed. Furthermore, minimal deformations of a mirror surface cause significant operating time differences in the laser beam, thus also adversely affecting the quality of the laser beam focal point and therefore the quality of the processing of the part with the laser.

Numerous suggestions for cooled mirrors for laser devices are known in the art. All of these suggestions are unsatisfactory.

A cooled mirror for a higher power laser is known, as is described in U.S. Pat. No. 4,443,059. In this mirror, the mirror surface consists of a layer made from a material with high thermal conductivity, of which, however, the thermal expansion coefficient is adapted as nearly as possible to the material of the components connected to the cooled mirror and therefore in particular to the thermal expansion coefficient of the connected cooler structure. Therefore, the materials recommended for the layer comprising the mirror surface are molybdenum, tungsten, silicon carbide or silicon nitride. The cooler structure is made from a further plate that is provided with a plurality of grooves on one side that are divided by stays and form cooling channels for the coolant. By means of the stays, this cooler structure is connected directly with the plate possessing the mirror surface. The side of the plate comprising the cooler structure facing away from the mirror surface is connected with a support body with a honeycomb profile containing channels for the inlet and outlet of the coolant.

The disadvantage is the complex and also non-symmetrical design of the mirror, so that the axis direction is perpendicular to the mirror surface, causing thermal deformations (bimetal effect). Another disadvantage is that the individual stays of the plate forming the cooler structure connect directly to the layer possessing the mirror surface without an additional intermediate layer, which causes uneven cooling and therefore deformations of the mirror surface. A final disadvantage of the known mirror is that it has a high material mass, which is undesirable for laser mirrors that are moved for processing of parts.

The groove-like cooling channels used also have the disadvantage that the stiffness of the mirror on the mirror surface in the longitudinal direction of the grooves is greater than in the transverse direction. In the necessary finishing of the mirror surface, for example by means of milling with a diamond tool, this causes structures to be formed in the mirror surface due to the varying stiffness, which also adversely affects the beam quality. This is a disadvantage of all known mirrors that use cooling channels that extend parallel to the mirror surface.

A further light-weight mirror for laser applications is described in U.S. Pat. No. 5,002,378. For the cooling of this known mirror, however, there is no cooler structure with connections for the inlet and outlet of a coolant, i.e. the mirror is not connected to an external coolant circuit. In this case, the cooler design is based on the heat-pipe cooling principle.

A further mirror structure cooled by a coolant, is shown in U.S. Pat. No. 3,781,094, in which the cooler structure consists of a plurality of perpendicularly crossing cooling channels that are all limited by stays. The disadvantage of this known construction is again the lack of symmetry in the direction perpendicular to the mirror axis, especially also of the cooler structure, in addition to the manufacturing expense. Moreover, the stays limiting the cooling channels of this known mirror likewise extend directly to the layer possessing the mirror surface, so that no homogeneous cooling of the mirror surface is achieved, which means that thermal deformations and faults in the mirror surface are unavoidable.

In a further known mirror for laser applications, a plurality of separate cooling channels are formed by using corrugated plates in the cooler structure as shown in U.S. Pat. No. 4,387,962. This known construction is likewise complex and does not possess the required symmetry.

A further known cooled mirror for laser applications described in DE 33 39 076 A1 has an extremely complex cooler structure and consists essentially of a plurality of posts that extend from the bottom of a plate forming the mirror surface and that are subjected to circulation by a coolant emitted from nozzles. The disadvantage here is likewise the very complex and therefore expensive construction in addition to the lack of a symmetrical design.

A further known cooled mirror for laser applications shown in U.S. Pat. No. 4,770,521 has a cooler structure formed directly beneath a layer comprising the mirror surface. Here the layer comprising the mirror surface is separated by a further layer parallel to this layer by a plurality of polygonal spacers, so that a space is formed between the two layers for circulation of a coolant. The disadvantage of this known cooler is likewise a complex and expensive design. Since the spacers are directly connected with the layer forming the mirror surface, no homogeneous cooling of the mirror surface is achieved.

Finally, a known cooled mirror for laser applications described in U.S. Pat. No. 4,403,828 consists of a very massive block that is provided on top with several grooves, each of which forms a cooling channel. A plate bearing the mirror surface is attached on the top by soldering to the stays of the grooves. The disadvantages here include the high weight of the mirror, making it unsuitable for a large number of applications. Moreover, there is no symmetrical design.

SUMMARY OF THE INVENTION

The object of the present invention is to describe a cooled mirror for laser applications with a mirror surface that possesses a high degree of thermal and mechanical stability despite the simple design of the mirror.

The design according to the present invention brings significant advantages:

For one thing, the cooler structure is achieved by means of a particularly simple construction in that a plurality of structured copper layers, i.e. layers provided with a plurality of openings, are connected with each other on the surface by means of direct copper bonding (DCB) technology in such a manner that these openings in the copper layers form an extensive network of channels for the coolant, and the stays surrounding the openings in the single copper layers also serve as continuous posts. The longitudinal sides of these posts lie perpendicular to the plane of the mirror surface and extend across the entire thickness of the cooler structure, i.e. starting from one of the copper layers adjacent to the first intermediate layer to the copper layer adjacent to the second intermediate layer of the cooler structure.

This design not only achieves the flow of coolant through the cooler structure, continuously branching out in all three perpendicular spatial axes and continuously supplying fresh coolant to the area of the first layer comprising or possessing the mirror surface, but also, due to the posts, achieves a high degree of overall mechanical stability and stiffness for the mirror. This prevents deformations of the mirror surface from thermal effects as well as mechanical force and/or pressure. In particular, the posts prevent the swelling of the cooler structure and therefore the deformation of the mirror surface due to the pressure of the coolant or unavoidable deviations in the pressure of the coolant during operation.

Another particular advantage of the present invention is the fact that the mirror has a completely symmetrical design with respect to the consecutive layers that are perpendicular to the mirror surface, which means that changes in temperature cannot cause deformations of the mirror surface. The intermediate layer made of the material with a reduced heat expansion coefficient that is connected directly to the first layer with the mirror surface, not only further improves the thermal stability of the first layer comprising or possessing the mirror surface, but this intermediate layer also especially ensures an even cooling effect on the first layer comprising or possessing the mirror surface. How crucial the mechanical stiffness and stability of a mirror for laser applications is, can be seen from the fact, for example, that even the bending of tubes for the inlet and outlet of coolant can cause changes in the mirror surface, which adversely affects the quality of the laser beam.

Use of the DCB technology prevents solder layers between the individual copper layers. This is essential not only for preventing corrosion, but also creating fine structures for the structured copper layers, i.e. the layers provided with holes and openings, which produces a high degree of homogeneity in cooling of the mirror surface. Furthermore, the use of the DCB technology also provides a high degree of stability, since there are no solder layers, which can be softer than the copper of the copper layers.

A very essential advantage of the design according to the present invention consists in the fact that the cooler structure, and therefore also the mirror in general, possesses the same stability in both axis directions defining the plane of the mirror surface on the top or mirror surface. This is a prerequisite for proper finishing of the mirror surface. The same stiffness of the mirror in both spatial axes defining the mirror surface is achieved by the fact that the cooler structure consists of the copper layers that are stacked one above the other and connected on the surface which each other and that are structured, i.e. provided with openings, instead of using groove-shaped cooling channels.

Moreover, the DCB technology improves the ability to process the copper during manufacture of the mirror surface, i.e. texturing of the copper is achieved, which enables significantly more even treatment of the surface.

The manufacture of the mirror surface in the present invention is achieved by suitable finishing of the top of the first layer facing away from the cooler structure, preferably by means of machining using a tool with a defined cutter, and thereby preferably by means of a diamond tool. The suitable process is also known as diamond turning.

The copper used in the mirror according to the present invention is preferably oxygen-free copper. This significantly increases the life of the mirror surface, due to the increased resistance against corrosion.

In the embodiment according to the present invention, the first intermediate layer made of the material with a reduced heat expansion coefficient that is directly connected to the first layer of copper comprising or possessing the mirror surface achieves a high degree of thermal stability for the mirror surface, so that for example a change in the laser power and/or temperature deviations from switching the laser on and off do not result in a negative deformation or alteration of the mirror surface.

In order to prevent the bimetal effect, i.e. warping of the mirror and especially of the mirror surface formed by the top due to temperature deviations, the multi-layer mirror body is symmetrical to a middle plane and therefore has a second intermediate layer made of the material with a reduced heat expansion coefficient that is connected to the second layer of copper forming the bottom of the mirror.

For the at least one intermediate layer made from the material with a reduced heat expansion coefficient, a material such as ceramic can also be used, which additionally provides for improved stability of the mirror.

As described above, the cooler structure consists of several connected cooler layers that are then structured in such a way that they form a cooler or cooler structure area with a fine structure of passageways for the coolant that continuously branch out in two, or preferably three spatial axes extending perpendicular to each other. The continuous posts bridging the cooler structure not only improve the cooling effect but also ensure the necessary mechanical stability and stiffness, especially pressure resistance of the mirror in the area of the cooler structure. Additionally, copper or a copper alloy is used for the cooler layers due to its high heat conducting properties.

BRIEF DESCRIPTION OF THE DRAWINGS

The present invention will be more clearly understood from the following detailed description of a representative embodiment thereof in conjunction with the following drawings.

DETAILED DESCRIPTION OF THE PREFERRED EMBODIMENTS

Figure 1:
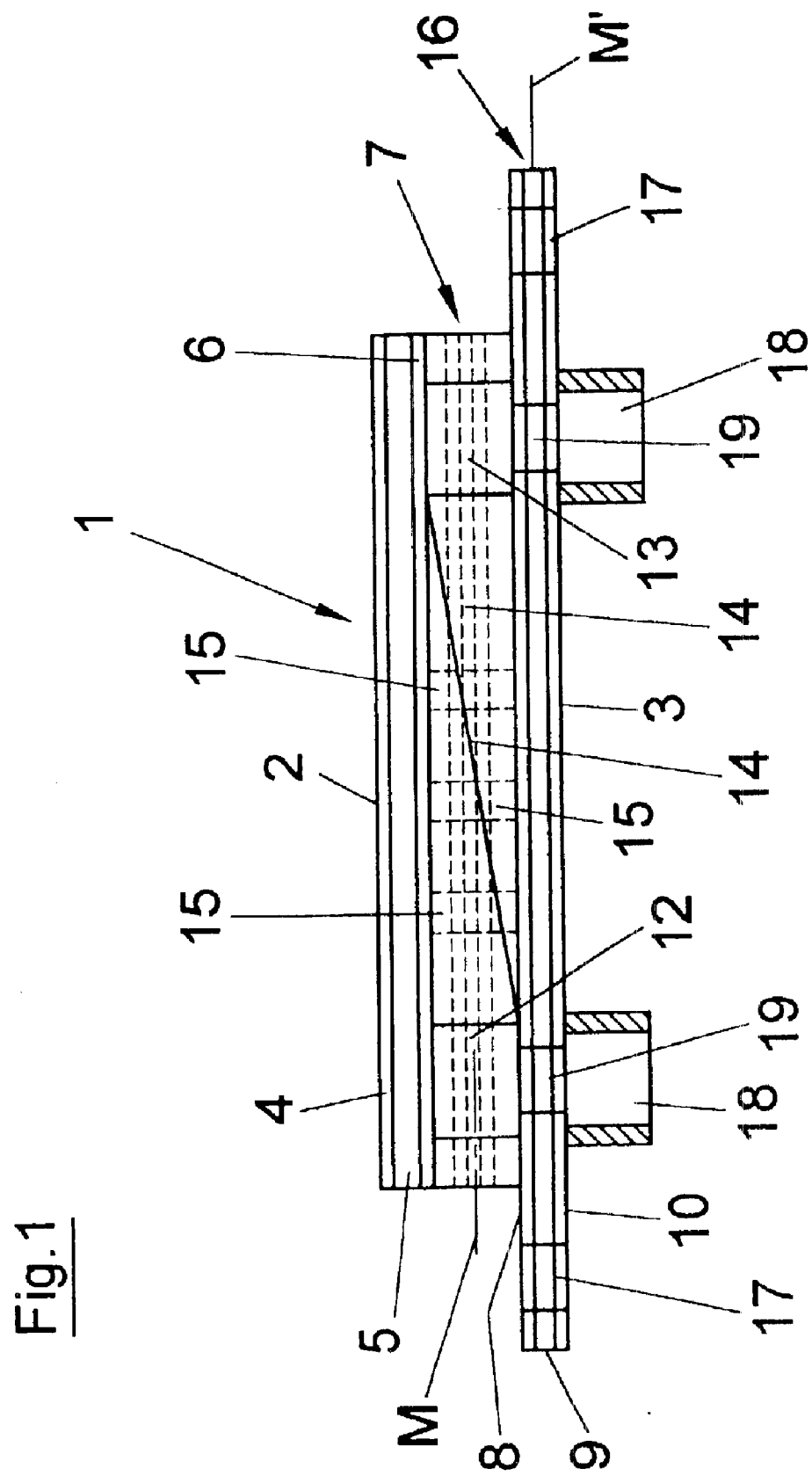
FIG. 1 is a simplified representation in side view of a mirror for laser applications according to the present invention.
Figure 2:
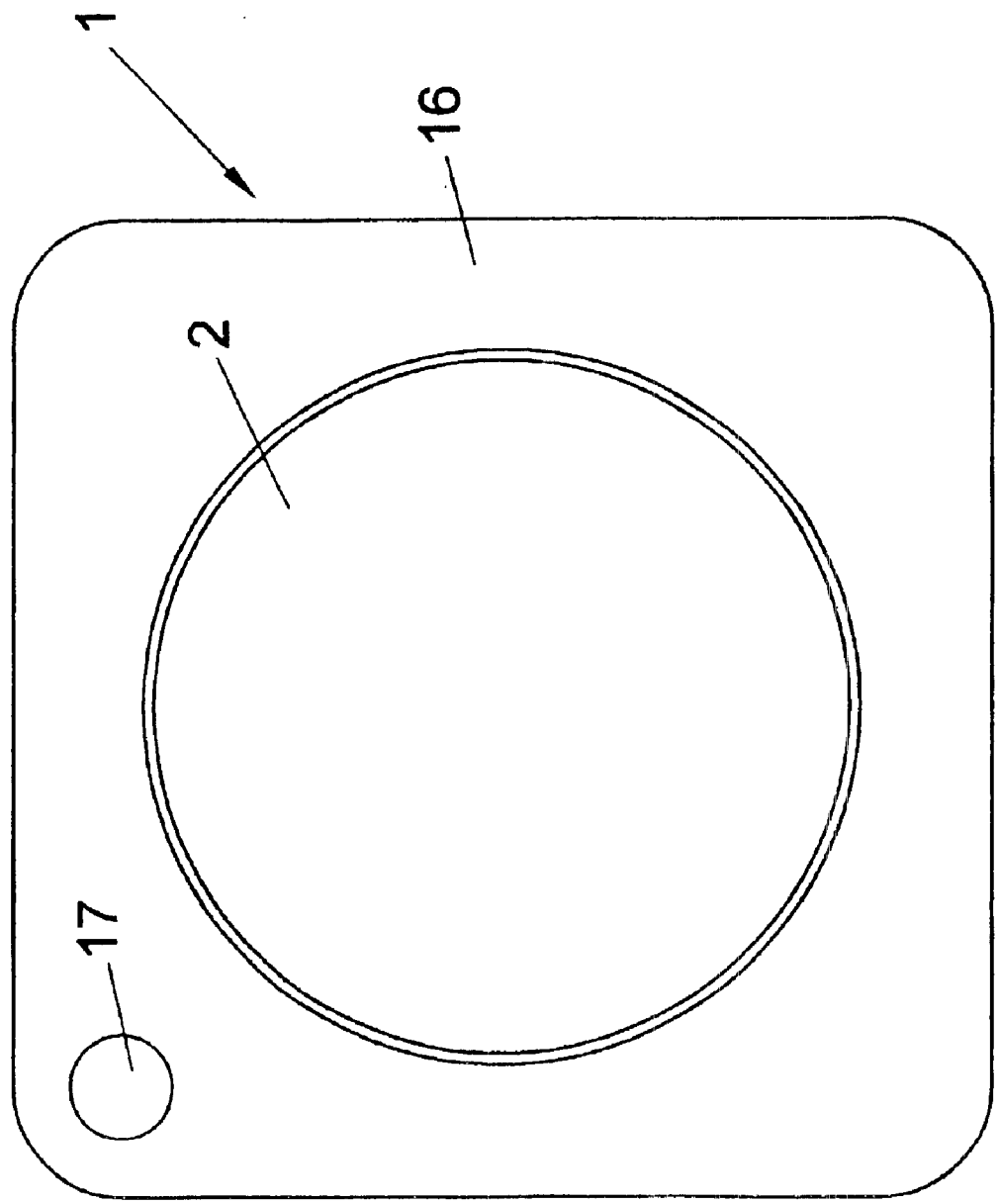
FIG. 2 is a top view of the mirror shown in FIG. 1.

The mirror generally designated 1 in the figures is intended for use in high-energy lasers, for reflecting the laser beam. The mirror 1 is constructed of several layers that are connected with each other on the surface in a suitable manner. In particular, the mirror 1 has the design described below, where the various areas and layers are connected with each other beginning from the top 2 of the mirror toward the bottom 3 of the mirror in the following order:

top copper layer 4 that forms the mirror surface on its open top side 2;

intermediate layer 5;

top copper or end layer 6 for the cooler structure 7 located beneath;

bottom copper or end layer 8 for the cooler structure 7;

intermediate layer 9;

bottom copper layer 10 that forms the bottom 3 of the mirror 1.

The intermediate layers 5 and 9 are made of a material that has a much lower heat expansion coefficient than the copper of the copper layers, namely equal to or less than $10 \times 10^{-6}[1/K]$. The intermediate layers 5 and 9 are preferably made from the same material.

The cooler structure 7 consists of a plurality of copper layers 11 that are connected with each other on the surface, the surfaces of which are also parallel to the top 2 and bottom 3 of the mirror b.

Figure 3:
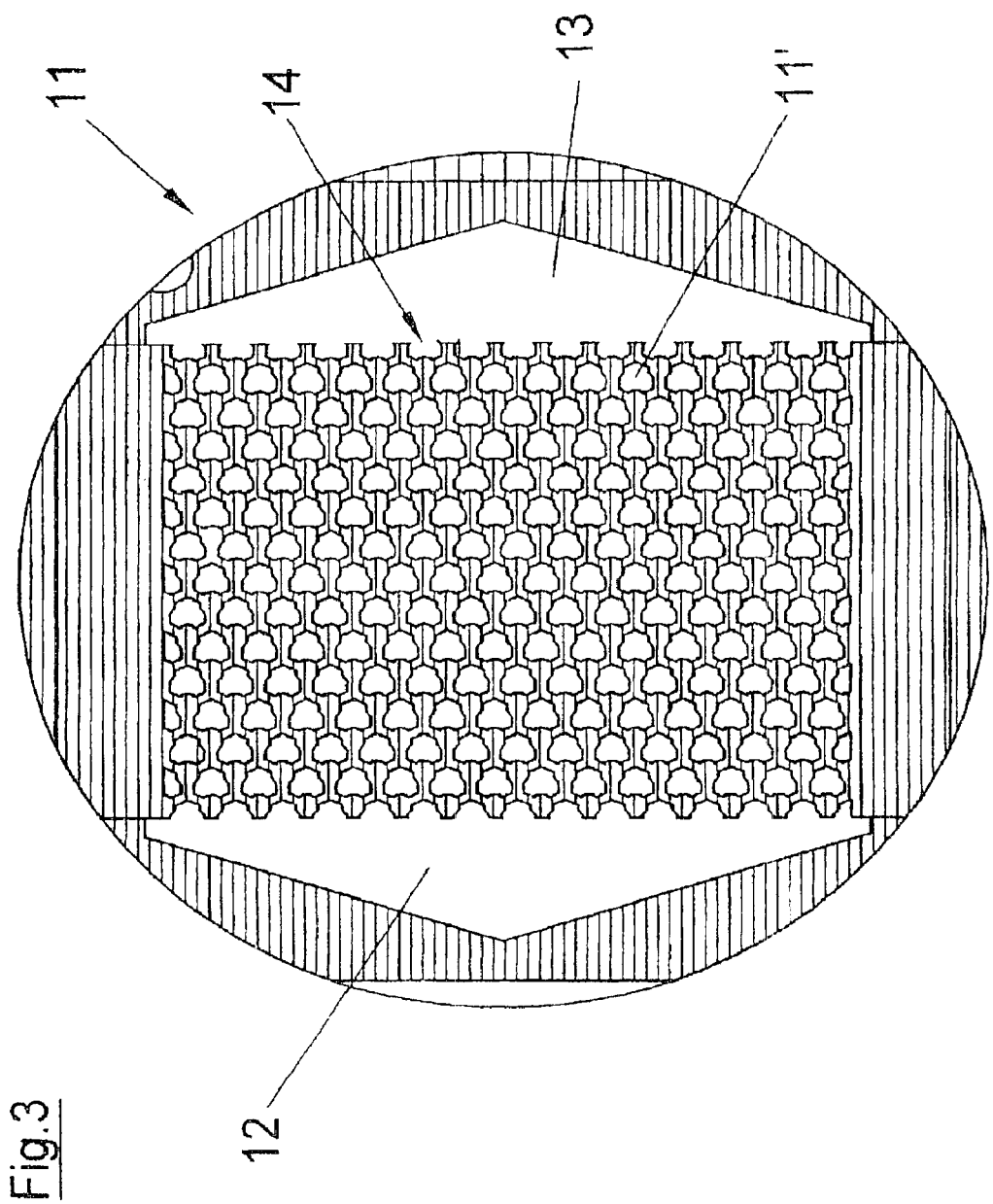
FIG. 3 is a top view of the layout of an embodiment of a structured cooler layer for use in the cooled laser mirror of FIGS. 1 and 2.
Figure 4:
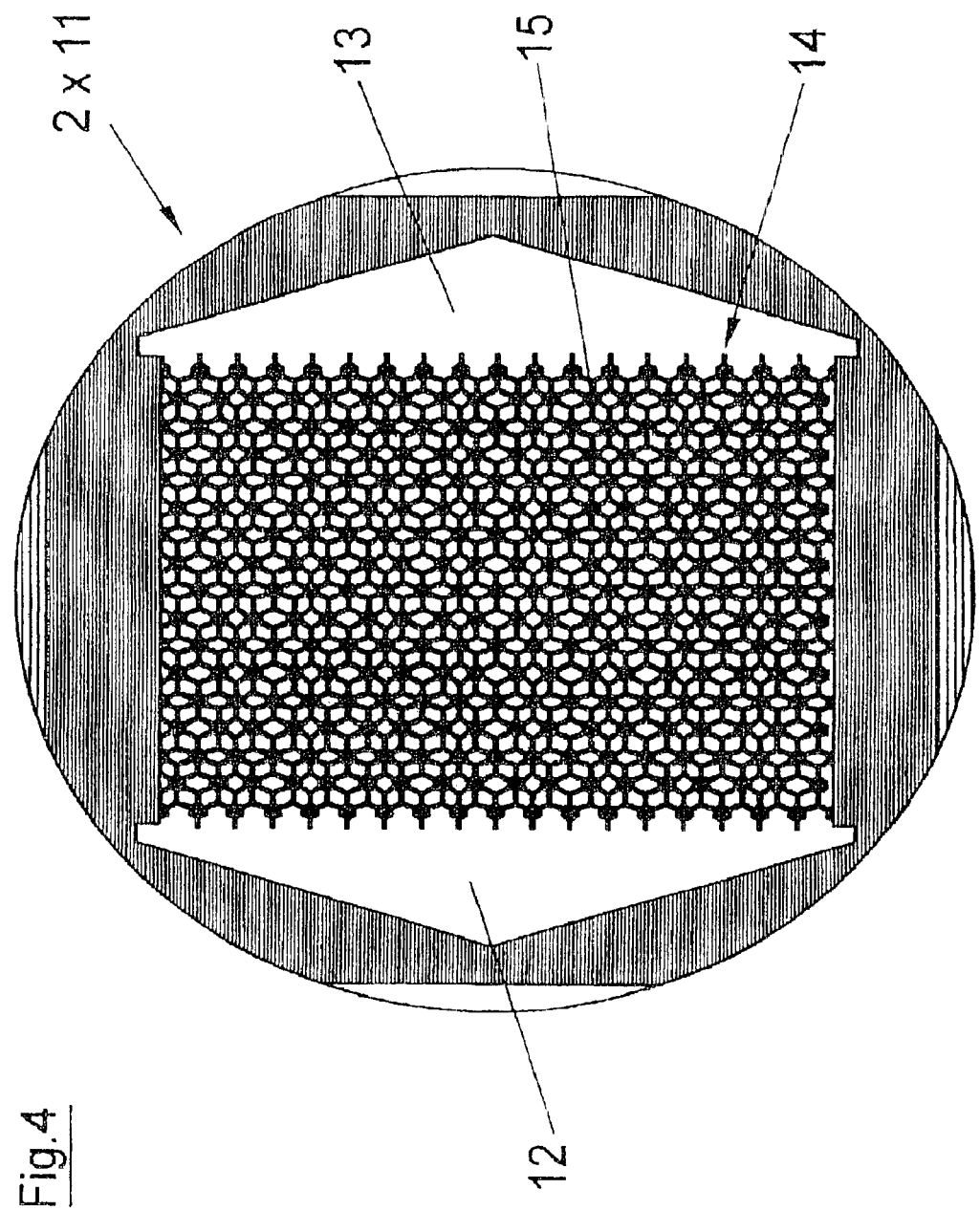
FIG. 4 a top view of the layout formed by two connected cooler layers.

As depicted in FIGS. 3 and 4, these cooler layers 11 are structured, i.e. provided with a plurality of openings and material stays surrounding these openings, in such a way they form two chambers 12 and 13 for the inlet and outlet of a preferably liquid coolant, for example water, and between these chambers a cooling area 14 with a finely structured network of passageways formed by the openings 11' for the coolant, which paths continuously branch out in all three perpendicular spatial axes, so that the coolant flows through this cooling area 14 being constantly diverted in all three spatial axes, thus producing an intensive cooling effect.

Furthermore, the cooler layers 11 are structured in such a way that continuous posts 15 made of copper are formed from the structuring or sections of the material stays surrounding the openings 11' in the connecting cooler layers, the longitudinal sides of which posts are perpendicular to the levels of the layers of the mirror 1 and, as the remaining wing-like sections of the structured cooler layers 11 protruding from these posts 15, are also subjected to the intensive flow of coolant. The posts 15 are needed for the effective infusion of the heat to be discharged into the cooling area 14 or the coolant. The posts 15 are also needed for the mechanical stability of the mirror, especially to prevent the expansion of the cooler structure 7 and therefore of the mirror 1 in general or warping of the mirror surface formed by the top 2 by the pressurized coolant. The mutual distance of the posts 15 is, for example, 1.0–8 mm, whereby the diameter of these posts is approximately half the distance between the posts.

In the depicted embodiment, the layers 4, 6, 8 and 10 and the cooler layers 11 are made of a copper foil. The intermediate layers 5 and 9 are made of ceramic, for example aluminum oxide or aluminum nitride ceramic. The intermediate layers 5 and 9 can also be made of a metal matrix compound material with a heat expansion coefficient equal to or less than $10 \times 10^{-6}$ [1/K], e.g. of copper silicon carbide or aluminum silicon carbide.

If the intermediate layers 5 and 9 are made of ceramic, especially aluminum oxide ceramic, then the individual layers are to be connected with each other on the surface in an especially simple manner using the common DCB technology, as described for example in U.S. Pat. No. 3,744,120 or in DE-PS 23 19 854. Another suitable method of connecting the layers is active soldering technology.

As shown in the figures, the layers 4–6 and the cooler layers 11 in the depicted embodiment have a circular shape with the same diameter, so that the part of the mirror 1 formed by these layers has the shape of a flat cylinder. The copper layers 8 and 10 and the intermediate layer 9 in the depicted embodiment both are square with the same edge dimensions, which are larger than the diameter of the circular layers 4–6 and 11. The layers 8–10 therefore form a flange 16 with a square cross-section extending evenly beyond the remaining circumference of the mirror 1 and on the same axis as the cylindrical part of the mirror 1. The corner areas the flange 16 are provided with fastening holes 17 for fastening the mirror to a holder not depicted.

The bottom 3 is provided with connections 18, one connection 18 for each of the chambers 12 and 13. These connections, which are also made of copper, are fastened in a suitable manner, e.g. by means of DCB technology, to the layer 10. For each connection 18 there is a continuous bore hole 19 in the layer 8–10, through which the connection 18 is connected with its chamber 12 or 13. For use of the mirror 1, the connections 18 are connected to an advance or return element for the coolant.

The intermediate layer 5 made of the material with a reduced heat expansion coefficient, for example of ceramic, is needed essentially to reduce the actual heat expansion of the layer 4, caused for example by switching the laser beam reflected by the mirror 1 on and off or by changes in the power of the laser beam and/or by deviations in the coolant flow to the extent that the quality and function of the mirror 1 is not adversely affected by temperature changes in the layer 4. In order to ensure this, the thickness of the intermediate layer 5 is greater than the thickness of layer 4. The thickness of the layer 5 is preferably between approximately 0.2 and 5 mm and the thickness of the layer 4 between approximately 0.1 and 0.6 mm.

Furthermore, the mirror 1 has a design that, with respect to the order of layers and the materials used for these layers, is symmetrical to an imaginary middle plane M that lies parallel to the top 2 and bottom 3 and also parallel to the layers 4–6, 8–10 and 11 and extends approximately in the middle of the cooler structure 7. For this reason, the intermediate layer 9 is provided for between the copper layer 10 forming the bottom 3 and the copper layer 8 closing the cooler structure 7 on the bottom, which (layer 9) is of the same material as the layer 5 and also has the same thickness as the layer 5. Furthermore, the layer 10 has the same thickness as the layer 4 and the layers between layers 5 and 9 on both sides of the middle plane M have the same thickness.

For reasons of simplifying the manufacturing process, all copper layers 4, 6, 8, 10 and 11 are made of a copper sheet or copper foil of the same thickness. The symmetrical design to the middle plane M also prevents the "bimetal effect".

The flange 16 in the depicted embodiment has an inherent symmetrical design to the middle plane M' of the intermediate layer 9. Therefore, the copper layers 8 and 10 located on each side of this intermediate layer have the same thickness. This symmetrical construction of the flange to the middle plane M' prevents warping of the flange 16 due to temperature deviations during use, therefore making adjustment of the mirror 1 unnecessary. Due to the use of ceramic for the intermediate layer 9, the flange 16 retains sufficient mechanical stability despite the use of copper for the layers 8 and 10.

The top 2 is processed to form a mirror surface, i.e. for example polished and/or diamond milled, in such a way that the surface roughness is less than 10 nm and deviations in the flatness are in any case less than 1 μm. In order to refine the mirror surface and/or improve the properties, especially the optical properties (reflection properties) of this mirror surface, a further thin layer of metal (precious metal), such as Ni, Au, Ag, Pt, Pd or an alloy can be applied to the finished top 2, for example with a thickness of 0.1 to 20 μm.

In the embodiment described above the layers 4, and for reasons of symmetry also the layers 6, 8, 10 and 11 are made of copper, since this material is especially easy to process, possesses excellent heat conducting properties and therefore ensures optimum cooling of the mirror 1 on the mirror surface, and since copper also has good reflection properties for the standard laser optical wave length.

The copper used for the layers 4, 6, 8, 10 and 11 is preferably low-oxygen or oxygen-free copper, which significantly increases the life of the mirror surface. To produce the mirror surface the layer 4 is machined or milled on its top surface facing away from the other layers, using a machining tool with at least one defined blade, for example a diamond tool, so that the mirror surface can be said to be diamond milled. The known "diamond turning process" is suitable for this processing step.

The present invention was described above based on a representative embodiment. Of course, numerous modifications and variations are possible without abandoning the inventive idea on which the invention is based. For example, it is possible to apply a hardened or tempered layer, for example of diamond, to the mirror surface for protection and/or optical refinement, e.g. by means of physical vacuum deposition (PVD). It is also possible, for example, that individual layers of the mirror consist of two single layers connected with each other on the surface.

What is claimed is:

1. A cooled mirror for laser applications having a mirror body provided with a mirror surface, the mirror body including several layers connected in a stack-like arrangement, the several layers including a cooler structure provided with connection for an inlet and outlet supplying coolant to the cooler structure, whereby the top layer of the several layers is made from copper forming or containing the mirror surface, comprising:
   a first intermediate layer made of a material with a reduced heat expansion coefficient equal to or smaller than $10 \times 10^{-6}$ [1/K], said first intermediate layer directly adjacent to the top layer;
   a bottom layer made from copper facing away from the top layer;
   a second intermediate layer directly adjacent to said bottom layer, said second intermediate layer made of a material with a reduced heat expansion coefficient;
   the cooler structure formed from a plurality of copper cooler layers provided between said first and second intermediate layers formed with a plurality of openings, with the area surrounding said openings forming continuous posts that extend in one axis direction perpendicular or crosswise to the mirror surface across the entire thickness of the cooler structure; and
   wherein all layers of the mirror body connect with each other on the surface by means of direct copper bonding technology or active soldering.

2. The mirror in accordance with claim 1, further including a first non-structured copper outer layer provided on one side of the cooler structure and a second copper outer layer provided on a second side of the cooler structure.

3. The mirror in accordance with claim 1, wherein the mirror body is symmetrical to a middle plane extending between the mirror surface and said bottom layer.

4. The mirror in accordance with claim 1, where said first and second intermediate layers are made of ceramic, preferably aluminum oxide, aluminum nitride or silicon carbide ceramic.

5. The mirror in accordance with claim 1, wherein said first and second intermediate layers are made of copper silicon carbide or aluminum silicon carbide.

6. The mirror in accordance with claim 1, wherein said first and second intermediate layers have a thickness that is greater than the thickness of the top layer and said bottom layer.

7. The mirror in accordance with claim 6, wherein said first and second intermediate layers have a thickness between approximately 0.2–5 mm.

8. The mirror in accordance with claim 1, wherein the top layer has a thickness between 0.1–0.6 mm.

9. The mirror in accordance with claim 1, wherein said bottom layer is part of a flange extending beyond the remaining circumference of the mirror.

10. The mirror in accordance with claim 9, wherein said flange comprises at least one of said cooler layers, said second intermediate layer and said bottom layer.

11. The mirror in accordance with claim 9, wherein said flange is symmetrical to a plane extending from the bottom of the mirror.

12. The mirror in accordance with claim 1, wherein the mutual distance between said posts is approximately 1.0–8.0 mm.

13. The mirror in accordance with claim 1, wherein said cooler layers form material sections or wings extending radially to said posts and projecting from them.

14. The mirror in accordance with claim 1, wherein the first layer has a diamond milled surface, preferably such that the roughness is less than 10 mm and deviations in the flatness are less than 1 μm.

15. The mirror in accordance with claim 1, wherein the mirror surface is formed by applying a layer of metal, such as Ni, Au, Ag, Pt, Pd or a metal alloy.

16. The mirror in accordance with claim 15, wherein said layer of metal has a thickness that is significantly less than the thickness of the top layer, for example, a thickness of 0.1 to 20 μm.

17. The mirror in accordance with claim 1, wherein the connection for the inlet and outlet face away from the mirror surface.

18. The mirror in accordance with claim 2, wherein the copper of the top layer, said bottom layer and said cooler layers including said first and second outer layers is a copper alloy.

19. The mirror in accordance with claim 2, wherein the copper of the top layer, said bottom layer and said cooler layers including said first and second outer layer, is a low-oxygen or oxygen free copper.

20. The mirror in accordance with claim 2, wherein at least one of the top layer, said bottom layer, said first and second intermediate layers, and said cooler layers including said first and second outer layers, comprises at least two single layers lying flat together and connected with each other.

* * * * *